(12) United States Patent
Ditto et al.

(10) Patent No.: US 8,520,191 B2
(45) Date of Patent: Aug. 27, 2013

(54) SLIT APERTURE FOR DIFFRACTION RANGE FINDING SYSTEM

(75) Inventors: Thomas D. Ditto, Ancramdale, NY (US); James A. Knapp, New York, NY (US)

(73) Assignee: 3Dewitt, LLC, Ancramdale, NY (US)

( * ) Notice: Subject to any disclaimer, the term of this patent is extended or adjusted under 35 U.S.C. 154(b) by 505 days.

(21) Appl. No.: 12/774,530

(22) Filed: May 5, 2010

(65) Prior Publication Data

US 2010/0290120 A1  Nov. 18, 2010

Related U.S. Application Data

(63) Continuation-in-part of application No. 12/554,363, filed on Sep. 4, 2009, now abandoned.

(60) Provisional application No. 61/094,445, filed on Sep. 5, 2008.

(51) Int. Cl.
*G01C 3/08* (2006.01)

(52) U.S. Cl.
USPC ............................................. 356/4.09

(58) Field of Classification Search
USPC .............................. 356/499, 3–22
See application file for complete search history.

(56) References Cited

U.S. PATENT DOCUMENTS

| | | | |
|---|---|---|---|
| 3,578,845 A | 5/1971 | Brooks et al. | |
| 4,381,149 A * | 4/1983 | Hair et al. | 250/206.1 |
| 4,394,069 A | 7/1983 | Kaye | |
| 4,864,395 A * | 9/1989 | Tajima | 348/139 |
| 5,165,063 A * | 11/1992 | Strater et al. | 356/4.01 |
| 5,200,792 A * | 4/1993 | Tajima et al. | 356/3.01 |
| 6,490,028 B1 | 12/2002 | Ditto et al. | |
| 2010/0110445 A1 | 5/2010 | Ditto | |

OTHER PUBLICATIONS

Office Action (Mail Date Dec. 27, 2010) for U.S. Appl. No. 12/554,363, filed Sep. 4, 2009.

* cited by examiner

*Primary Examiner* — Tarifur Chowdhury
*Assistant Examiner* — Jonathon Cook
(74) *Attorney, Agent, or Firm* — Schmeiser, Olsen & Watts, LLP (57) ABSTRACT

A method and system for forming a focused image on an image plane of a diffraction range finder with a variable pitch diffraction grating. Diffracted light is propagated through a lens and slit assembly and onto an image plane of a camera, the diffracted light having been diffracted by the variable pitch diffraction grating. The lens and slit assembly includes lens elements and a slit. The slit is surrounded by opaque material that is opaque to the diffracted light passing through the slit. The slit has a shape characterized by a long dimension and a short dimension that is shorter than the long dimension.

20 Claims, 9 Drawing Sheets

Fig. 1

Prior Art

Fig. 6 (b) Spot Diagram

Spot Diagram

SLIT APERTURE FOR DIFFRACTION RANGE FINDING SYSTEM

RELATED APPLICATIONS

This Continuation-In-Part application claims priority to U.S. Non-Provisional Application Ser. No. 12/554,363, filed Sep. 4, 2009 now abandoned, with the U.S. Patent and Trademark Office and incorporated herein in its entirety, which claims priority to a U.S. Provisional Application Ser. No. 61/094,445, filed Sep. 5, 2008, with the U.S. Patent and Trademark Office.

STATEMENT OF GOVERNMENT INTEREST

The invention described herein may be manufactured and used by the Government of the United States of America for governmental purposes without payment of any royalties thereon.

FIELD OF THE INVENTION

The present invention relates to a means to increase to sensitivity and focus acuity in diffraction range finders by substitution of a slit aperture for a pinhole aperture.

BACKGROUND OF THE INVENTION

Range finding by diffraction is comprised of the methods, devices and systems used to measure distance through exploitation of a phenomenon observed with diffraction gratings wherein the displacement between diffraction images of the various diffraction orders can be correlated to the distance from the grating to an observed source of energy illuminating the grating. Higher-order diffraction images of a target are reconstructed at a receiver which has a means to focus the radiation onto a transducer that can sense the position of the higher-order diffraction images. As a target is moved toward or away from a grating surface, the relative displacement of a higher-order image from both the zero-order image and other higher-orders images can be measured so as to take target range. The present inventor has demonstrated such a range finder under grants from the National Science Foundation (NSF DMI-9420321). When the diffraction grating is the hologram of a point source and the target is positioned at an angle of grazing incidence relative to the grating, it is possible to form profiles in the microscopic regime. Such an embodiment was developed under a grant from the National Science Foundation (NSF IIP-0724428).

The basis of the present invention derives from U.S. Pat. No. 6,490,028, "VARIABLE PITCH GRATING FOR DIFFRACTION RANGE FINDING SYSTEM," issued to Ditto and Lyon on Dec. 3, 2002 (hereinafter, '028 patent). As illustrated by FIG. 4 (a) in the '028 patent supra, and reproduced here as FIG. 1 in accordance with the prior art, a lens 210 is employed to focus higher-order diffraction images inside camera 200. Exemplary rays are traced from range points 330 on light beam 320 along rays 160 through variable pitch diffraction grating 122 after which ray bundles 150 are brought to a focus inside camera 200. The rays cross through a point at a perspective center inside lens 210. This point is a pinhole approximation of a lens. When an actual lens is used, alternative ray paths in bundles 160 and 150 will result in a less than optimal focus at the receiver, most particularly when the grating 122 is a variable pitch grating (also called a "chirped grating").

Figure 1:
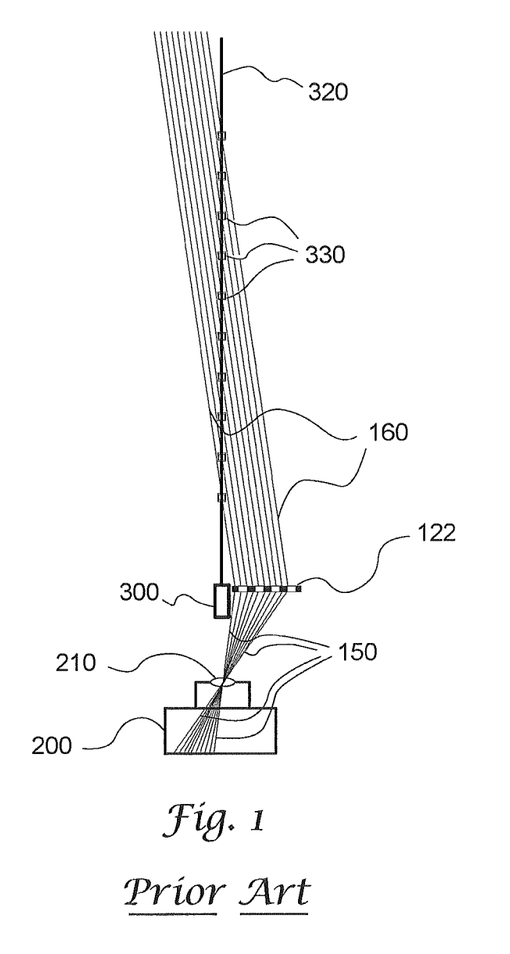
FIG. 1 pictorially shows a variable pitch diffraction range finder with a laser as a structured light source and a receiver, in accordance with the prior art.

The utility of a pinhole at lens 210 of FIG. 1 can be appreciated by an understanding of the fabrication of the variable pitch grating itself. The variable pitch grating used in the '028 Patent supra can be fabricated by means of holography. A variable pitch hologram can be created through the intersection of a plane wave originating from a collimator and a spherical wave originating from the pinhole aperture in a spatial filter, a process that is cited in '028 Patent supra by reference to U.S. Pat. No. 3,578,845 issued to Brooks et al. on May 18, 1971 for "Holographic Focusing Diffraction Gratings for Spectroscopes and Method of Making Same."

Figure 2:
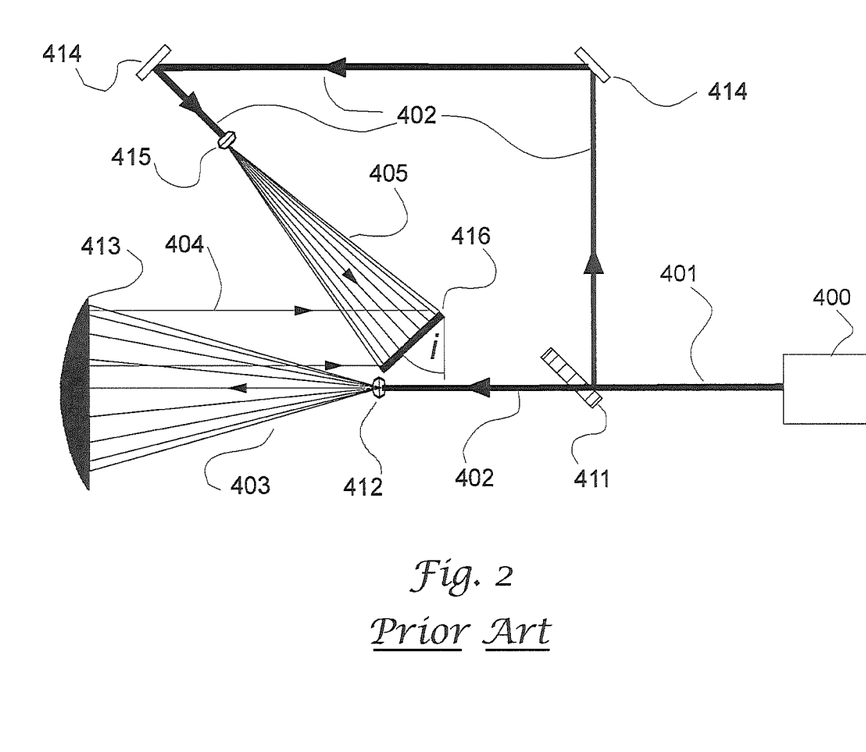
FIG. 2 illustrates the fabrication of a variable pitch grating by means of holography, in accordance with the prior art.

The holographic optical train can be a recording process of the type illustrated in FIG. 2, in accordance with the prior art. Laser 400 produces a coherent monochromatic collimated beam of light 401 which is divided by beam splitter 411 into two beams 402. Spatial filter 412, comprised of a combination lens and pinhole, expands one beam 402 into a spherical wave 403 which is collimated by parabolic mirror 413 and made incident as wavefront 404 upon holographic recording plate 416 set at angle i relative to incident plane wave 404. The other laser beam 402 divided by beam splitter 411 is also sent by folding mirrors 414 to spatial filter 415 where it is expanded into a spherical wave 405 to be incident at the surface about normal to holographic plate 416. The wavefronts 404 and 405 interfere to cause a pattern that constitutes the variable pitch grating used in a diffraction range finder.

When a pinhole is used in lieu of lens 210 in FIG. 1 as per the illustrations of '028 Patent supra, the images formed in camera 200 are sharply focused. If the pinhole is of exactly the same diameter as the pinhole that was used to make the spherical wave in the fabrication of the hologram, i.e., the variable pitch grating, the resulting image formed on the image plane of the camera can be optimal in acuity. However, very little light is captured by the camera from the point of origination along the light beam 320 projected from laser 300, because of the small dimensions of the pinhole. Alternatively, a lens 210 can be used in front of the camera 200, but when a normal lens is used, multiple ray paths through the lens create a focus blur in the final image.

SUMMARY OF THE INVENTION

The present invention provides a method for forming a focused image on an image plane of a diffraction range finder with a variable pitch diffraction grating, said method comprising:

propagating diffracted light through a lens and slit assembly and onto an image plane of a camera, said diffracted light having been diffracted by the variable pitch diffraction grating, said lens and slit assembly comprising a plurality of lens elements and a slit, said slit surrounded by opaque material that is opaque to the diffracted light passing through the slit, said slit having a shape characterized by a long dimension and a short dimension that is shorter than the long dimension.

The present invention provides a system for forming a focused image on an image plane of a diffraction range finder with a variable pitch diffraction grating, said system comprising:

the variable pitch diffraction grating; and a lens and slit assembly through which diffracted light may traverse after having been diffracted by the diffraction grating, wherein the diffracted light is configured to form a focused image on an image plane of a camera after traversing the lens and slit assembly, said lens and slit assembly comprising a plurality of lens elements and a slit, said slit surrounded by opaque material that is opaque to the diffracted light configured to pass through the slit, said slit having a shape characterized by a long dimension and a short dimension that is shorter than the long dimension.

BRIEF DESCRIPTION OF THE DRAWINGS

FIG. 4 (a) shows a magnified detail of the image plane from FIG. 3 detailing the exemplary rays passing through a pinhole and on to the image plane, in accordance with embodiments of the present invention.

FIG. 4 (b) is a spot diagram of the exemplary target points that would be formed at the image plane using a pinhole aperture, in accordance with embodiments of the present invention.

FIG. 4 (c) represents the visible image formed at the image plane with a pinhole aperture where some of the targets are missing because of light starvation caused by a pinhole, in accordance with embodiments of the present invention.

FIG. 6 (a) shows a magnified detail of the image plane from FIG. 5 detailing the exemplary rays passing through a slit and on to the image plane, in accordance with embodiments of the present invention.

FIG. 6 (b) is a spot diagram of the exemplary target points that would be formed at the image plane using the slit aperture of FIG. 5, in accordance with embodiments of the present invention.

FIG. 6 (c) represents the visible image formed at the image plane with the slit aperture of FIG. 5 where all of the targets are visible in the image plane because of the increased efficiency of the slit aperture, in accordance with embodiments of the present invention.

FIG. 9 (b) represents the visible image formed on the focal plane using the lens and slit assembly in FIGS. 7(a), 7(b), and 8, in accordance with embodiments of the present invention.

DETAILED DESCRIPTION OF THE INVENTION

The present invention uses a slit type aperture in the secondary of a diffraction range finder with a slit spacing equivalent to the diameter of a pinhole aperture used in the prior mathematical models and physical embodiments of diffraction range finders that use variable pitch gratings. The acuity of the image formed with a slit is comparable to the acuity of the image formed with a pinhole but better than ten times more light passes through the slit than passes through the pinhole. When the invention has an embodiment where a lens is used to collect light for the slit aperture, the efficiency further improves as does the focus acuity.

The present invention increases the amount of light passed through the lens at the perspective center inside of a diffraction range finder.

The present invention specifies the shape of the aperture at the perspective center inside of a diffraction range finder.

The present invention generates sharply defined images at the transducer image plane of the camera inside of a diffraction range finder.

The present invention achieves a weight and size savings over range finding systems of equivalent performance based on mirrors and lenses.

The present invention is robust in operation and requires little maintenance or care. The present invention is extensible in application from a small scale instrument for microscopic range finding to large instruments for longer distances of many meters.

To appreciate the necessity of limiting the spatial dimensions of the pupil in a camera that uses a primary objective chirped grating, the image formed without a pinhole iris can be modeled in the optical engineering program, Zemax® available from the Zemax Development Corporation of Bellingham, WA. This software models the behavior of light as it passes through a hologram of the type illustrated by FIG. 2. The Zemax® program also has features to model a stop such as a pinhole or a slit. Zemax® software has analysis features that predict the acuity or focus of an image formed on the final image plane of a camera.

Figure 3:
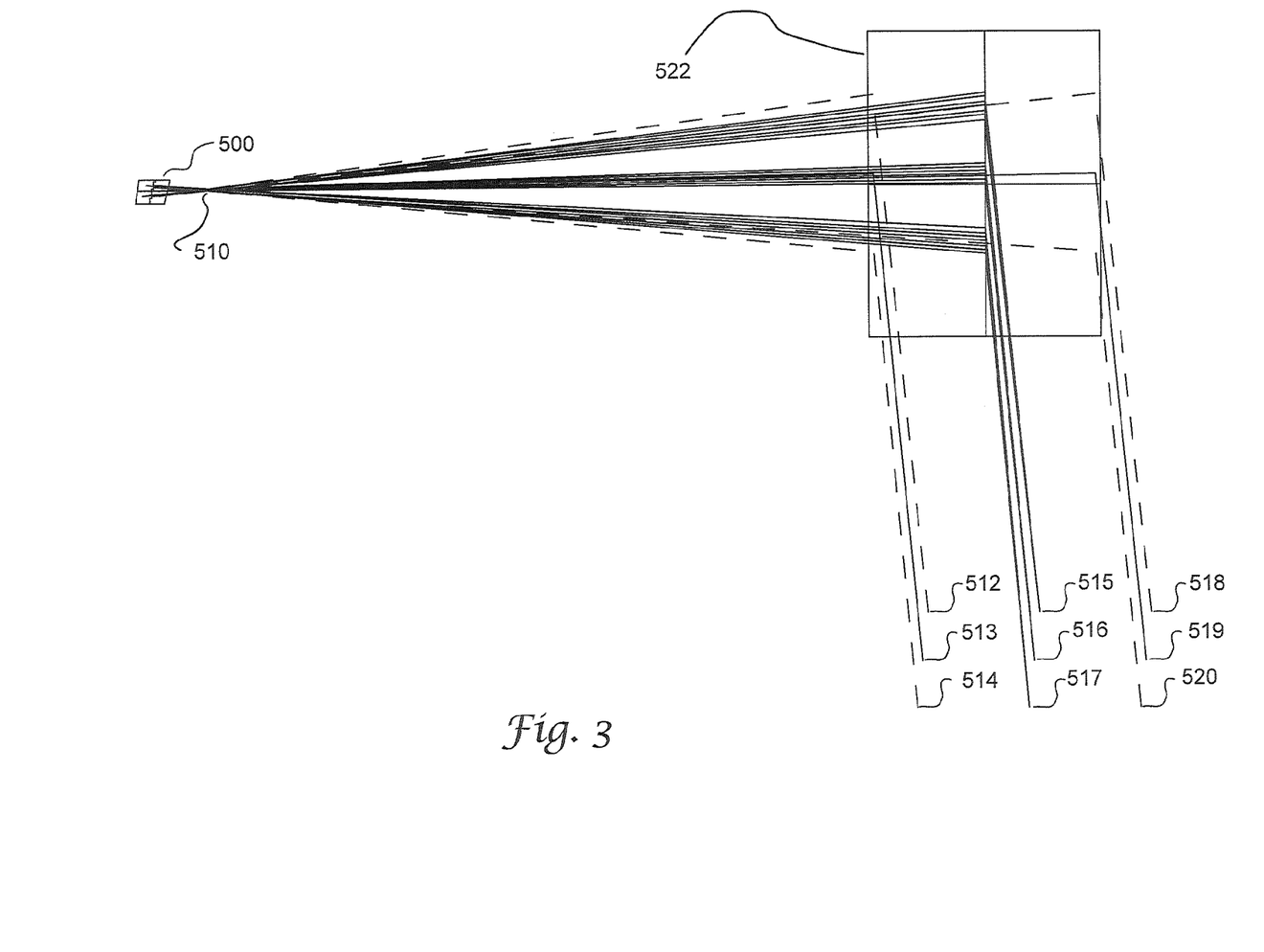
FIG. 3 pictorially shows a diffraction range finder where a pinhole is used to increase the acuity of the image on the camera image plane, in accordance with embodiments of the present invention.

FIG. 3 pictorially shows a diffraction range finder where a pinhole is used to increase the acuity of the image on the camera image plane, in accordance with embodiments of the present invention. FIG. 3 depicts the Zemax® rendering of the diffraction range finder with variable pitch grating 522 as its primary objective. Light originating from exemplary points of different displacements and ranges, 512 to 520, are ray traced through variable pitch grating 522 to pinhole 510 and received at image plane 500. Notably, the rays from points 512, 514, 518 and 520 are shown as dashed lines, because their flux levels are so low that they cannot be visibly detected at the image plane 500.

Figure 4:
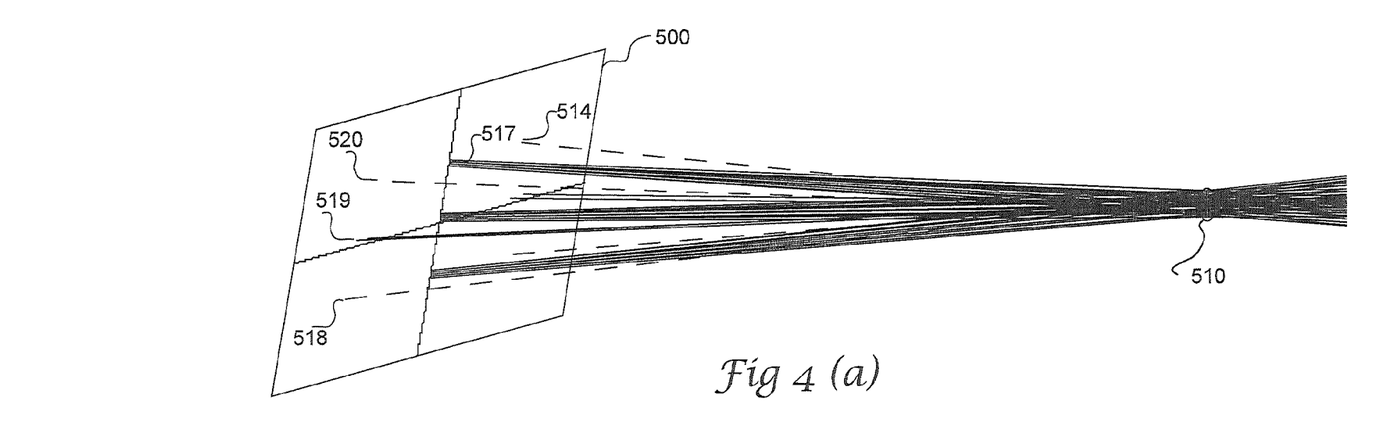

FIG. 4 (a) shows a magnified detail of the image plane 500 from FIG. 3 detailing the exemplary rays passing through the pinhole 510 and on to the image plane 500, in accordance with embodiments of the present invention. FIG. 4 (a) is populated with overlapping rays that obscured labeling, so only targets 514, 517, 518, 519 and 520 are labeled explicitly, but the ray bundles of all targets are traced. The dashed rays of 514, 518, and 520 show that these targets would not be visible because of light starvation caused by the narrow stop of pinhole 510 that chokes flux from the variable pitch grating.

FIG. 4 (b) is a spot diagram of the exemplary target points that would be formed at the image plane 500 using a pinhole 510 aperture, in accordance with embodiments of the present invention. If the occluded targets could be imaged, the spot diagram of FIG. 4 (b) shows that they would have the same geometric acuity as their sister rays that do successively pass through the pinhole 510. All nine rays are rendered in the spot diagram. If flux was infinite, all nine rays could be seen; however, flux is finite.

FIG. 4 (c) represents the visible image formed at the image plane 500 with a pinhole 510 aperture where some of the targets are missing because of light starvation caused by the pinhole 510, in accordance with embodiments of the present invention. Images of targets 513, 515, 516, 517 and 519 appear at the image plane, but targets 512, 514, 518 and 520 do not.

Figure 5:
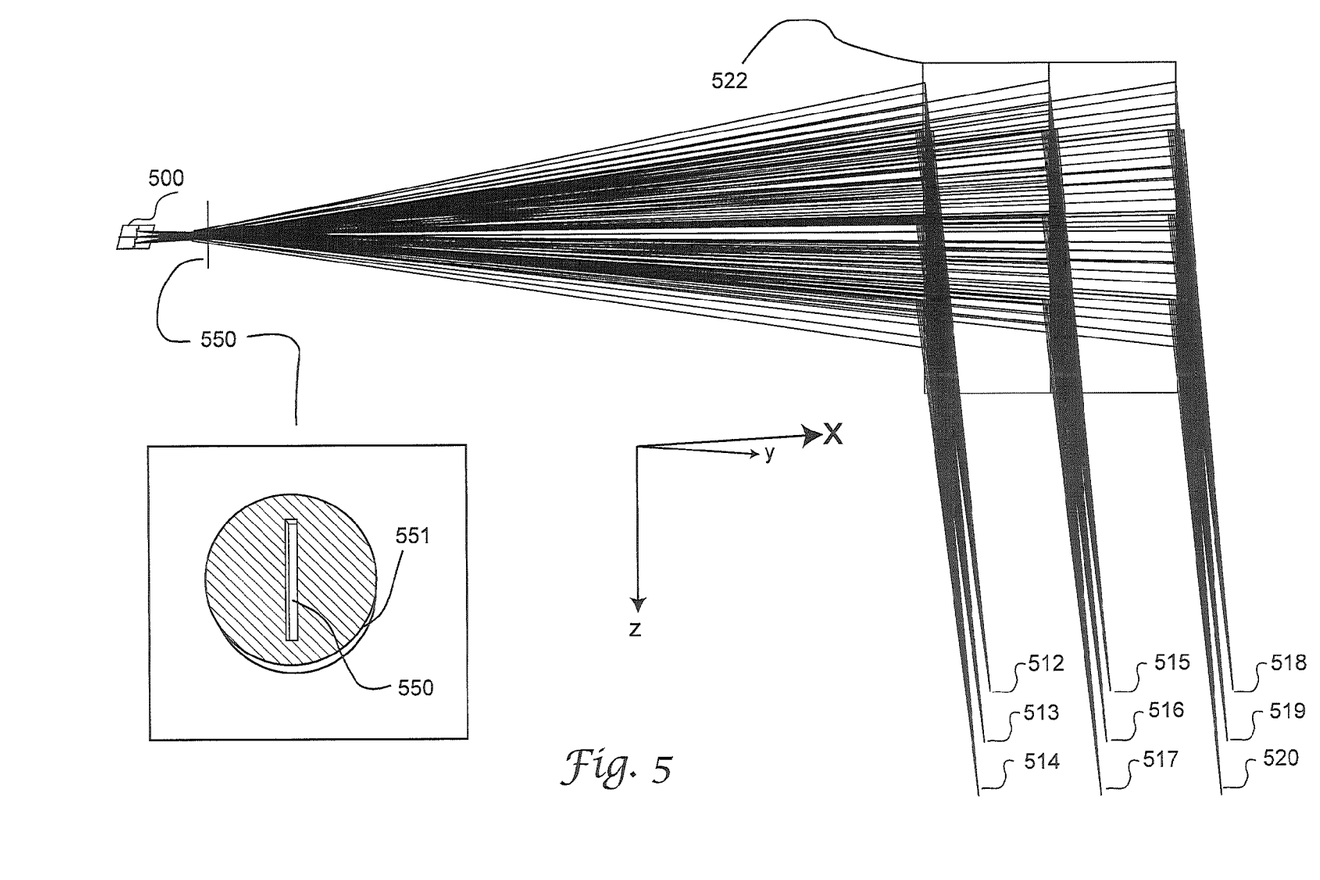
FIG. 5 pictorially shows a diffraction range finder where a slit is used to increase the acuity of the image on the camera image plane, in accordance with embodiments of the present invention.

FIG. 5 pictorially shows a diffraction range finder where a slit is used to increase the acuity of the image on the camera image plane, in accordance with embodiments of the present invention. FIG. 5 depicts the identical diffraction range finder with the identical hologram as that of FIG. 3. The targets 512 through 520 are the same nine points with the same displacements and ranges as shown in FIG. 3. However, instead of a pinhole, slit 550 has been inserted where the pinhole 510 was used in FIG. 3. The structure of the slit 550 is a transmissive aperture of considerably greater length (i.e., long dimension in the z direction) than width (i.e., short dimension) surrounded by opaque material 551, as seen in the breakout panel of FIG. 5. The opaque material 551 is opaque to the diffracted light passing through the slit 550.

It can be appreciated by comparing FIGS. 3 and 5 that the ray bundles in FIG. 5 are much broader in one of the two dimensions. This broadening of the ray bundles corresponds to an increase in the flux transmitted through the slit stop as compared with the paucity of flux that can be emitted from a pinhole. There are no attenuated rays denoted with dashed lines as there were in FIGS. 3 and 4 (*a*), because all targets in FIG. 5 are visible at the image plane 500.

Figure 6:
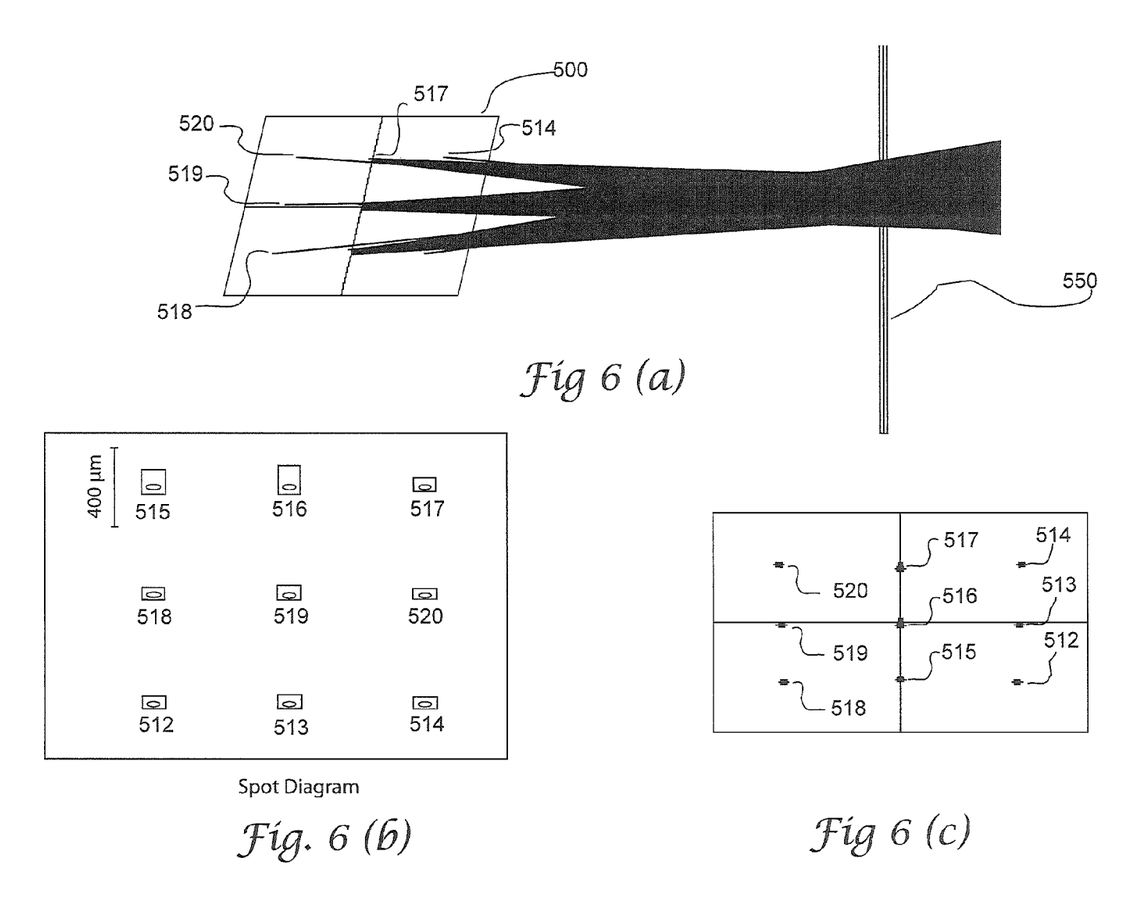

FIG. 6 (*a*) shows a magnified detail of the image plane 500 from FIG. 5 detailing the exemplary rays passing through the slit 550 and on to the image plane, in accordance with embodiments of the present invention. The density of rays at the image plane 500 in FIG. 6(*a*) for all target points of FIG. 5 is an indicator of how much brighter the exemplary target points will be. The density of rays prohibits marking all rays in the illustration, but points 514, 518, and 520 are illustratively indicated. Solid ray bundles reach image plane 500 for these points (514, 518, 520) and all other target points.

FIG. 6 (*b*) is a spot diagram of the exemplary target points that would be formed at the image plane 550 using the slit 550 aperture of FIG. 5, in accordance with embodiments of the present invention.

FIG. 6 (*c*) represents the visible image formed at the image plane with the slit aperture of FIG. 5 where all of the targets are visible in the image plane because of the increased efficiency of the slit aperture, in accordance with embodiments of the present invention. This visibility of all targets in the image plane in FIG. 6(*c*) can be compared with the visibility of the targets in the image plane in FIG. 4 (*c*) where four of the nine targets were not visible because of attenuation caused by the pinhole aperture 510.

Notably, when the spot diagrams of FIG. 4 (*b*) from the pinhole and FIG. 6 (*b*) from the slit are compared, the acuity or focus is nearly identical, notwithstanding that the distribution of energy in the spot diagram of FIG. 4 (*b*) is elliptical and FIG. 6 (*b*) is rectangular. This subtle difference between pinhole and slit apertures in the shape of a resolved point may have some numerical consequences in image processing but is far less of an impediment in forming an image than when flux is simply not available, as occurs for many targets imaged with a pinhole rather than a slit.

Although the invention can be implemented with a slit alone, it is beneficial in one embodiment to place the slit at the position normally occupied by an iris diaphragm of a lens system. The use of a lens assembly allows greater latitude than the slit alone for variations in alignment relative to the diffraction grating of the diffraction range finder.

Figure 7:
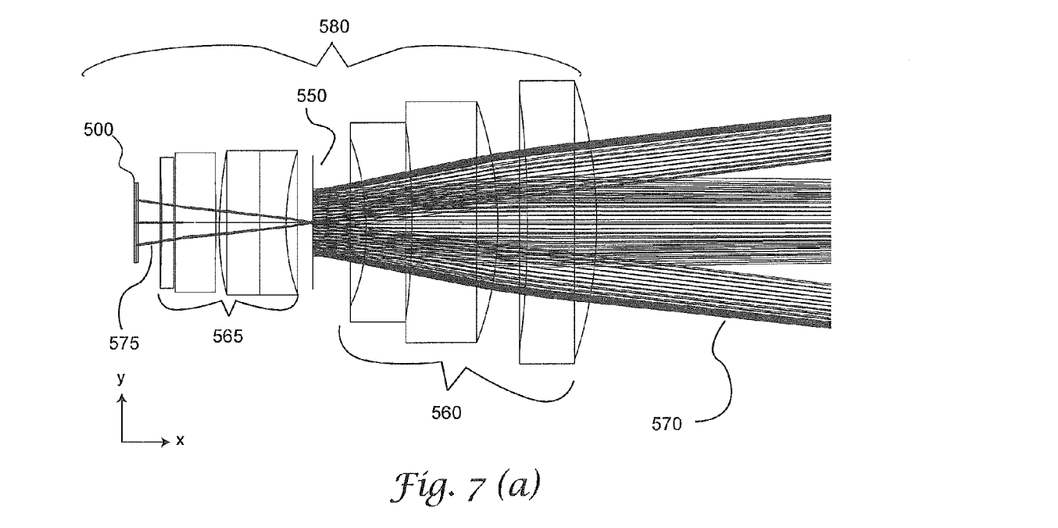
FIGS. 7(a) and 7(b) show different views of a lens that has been modified to become a lens and a slit assembly in which a slit aperture resides where an iris diaphragm is normally located, in accordance with embodiments of the present invention.

FIGS. 7(*a*) and 7(*b*) show orthogonal views of a lens that has been modified to become a lens and a slit assembly 580 in which a slit aperture 550 resides where an iris diaphragm is normally located, in accordance with embodiments of the present invention. The slit 550 has a rectangular shape with a long dimension (i.e., length) and a short dimension (i.e., width) that is shorter than the long dimension and is orthogonal to the long dimension as depicted in FIG. 5. The axis of the slit is along the long dimension of the slit. FIG. 7(*a*) shows the lens as seen facing the short side of the slit 550, and FIG. 7(*b*) shows the lens as seen facing the long axis of the slit 550. The lens in FIGS. 7(*a*) and 7(*b*) comprises three front elements 560 and four rear elements 565 and was generated as a computer by the program Zemax®. The lens and a slit assembly 580 includes the slit (i.e., elements 560 and 565) and the slit aperture 550 as shown.

In FIGS. 7(*a*) and 7(*b*), the iris diaphragm has been replaced with the slit 550 aperture. The three front elements (560) of the lens and the four rear elements (565) of the lens form an image on the focal plane 500. FIGS. 7(*a*) and 7(*b*) illustrate exemplary target rays 570 that propagate along the x axis and interact with slit 550 to produce reduced ray bundles 575 after passing through the aperture of the slit 550 which arrive at and focus on image plane 500. FIG. 7(*a*) illustrates the masking of the ray bundle 570 as seen facing the short dimension the slit 550, wherein the axis of the slit is oriented in the z direction causing the passage of the ray bundle 570 through the slit 550 to be constrained by the short dimension of the slit 550. FIG. 7(*b*) shows the transmission of the ray bundle 570 as seen facing the long dimension of the slit 550, wherein the axis of the slit is oriented in the z direction causing the passage of the ray bundle 570 through the slit 550 to be unconstrained by the long dimension of the slit 550 if the long dimension of the slit is sufficiently long to enable the entire extent of the ray bundle in the z direction to pass through the slit. Thus, FIG, 7(*b*) illustrates how ray bundle 575 after the slit is not masked or attenuated in the number or rays by the presence of the slit 550 aperture. The practical consequence is that the lens forms a focused image with the benefit of a slit aperture.

Figure 8:
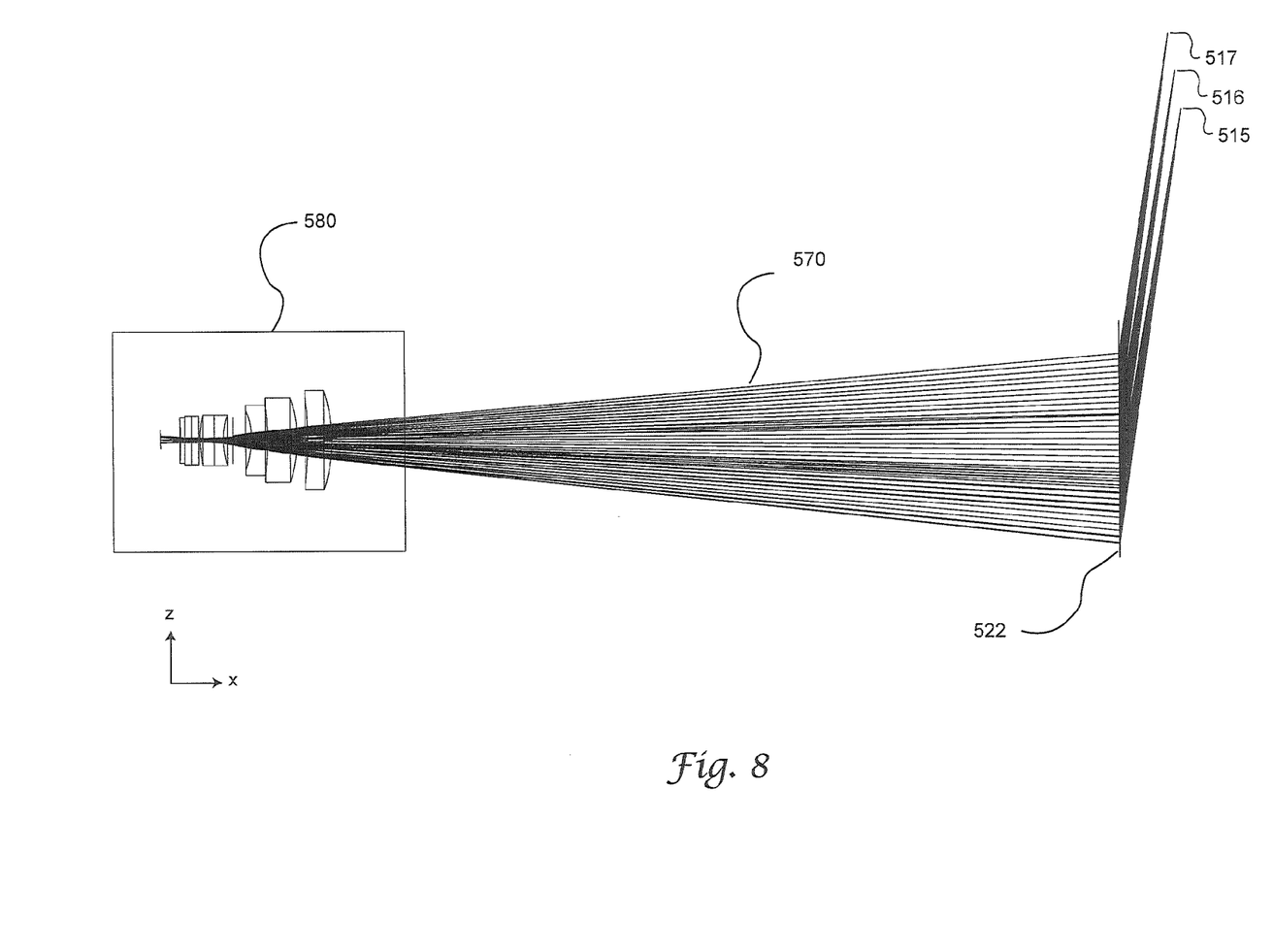
FIG. 8 shows a diffraction range finder comprising the lens and a slit assembly of FIG. 7(b), in accordance with embodiments of the present invention.

FIG. 8 shows a diffraction range finder comprising a lens and a slit assembly 580 of FIG. 7(*b*), in accordance with embodiments of the present invention. The lens and slit assembly 580 comprises the three front elements 560 of the lens, the four rear elements 565 of the lens, and the slit 550 disposed between the three front elements 560 and the four rear elements 565. Thus, the lens and slit assembly 580 is a lens in which a slit is placed where an iris diaphragm of a conventional lens would be located. The chirped grating 522 forms ray bundle 570 from exemplary targets 515, 516 and 517.

Figure 9A:
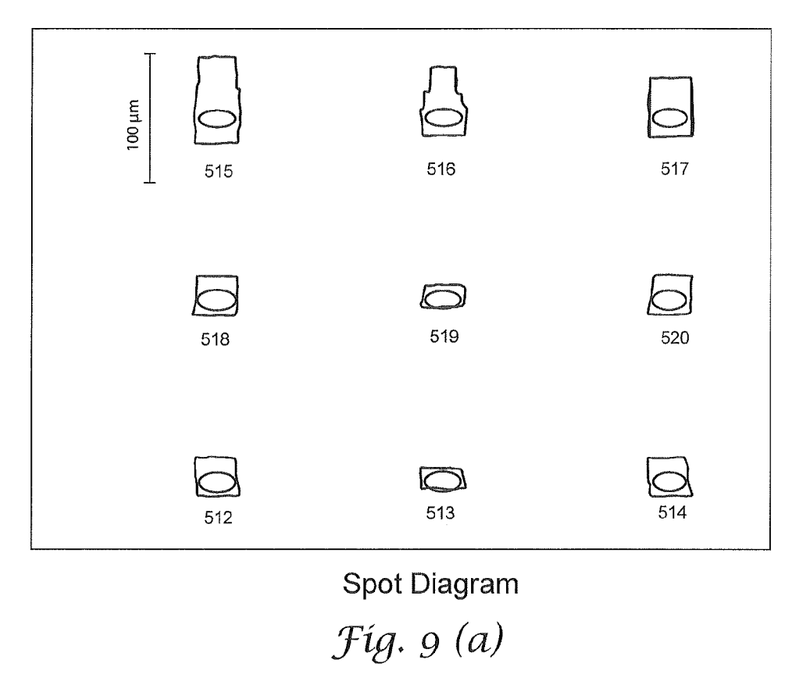
FIG. 9(a) shows a spot diagram of the exemplary target points to be formed at the image plane using the lens and slit assembly in FIGS. 7(a), 7(b), and 8 in place of an iris diaphragm, in accordance with embodiments of the present invention.

FIG. 9(*a*) shows a spot diagram of the exemplary target points to would be formed at the image plane using a lens and slit assembly 580 in FIGS. 7(*a*), 7(*b*), and 8 in place of an iris diaphragm, in accordance with embodiments of the present invention. All of the targets are more sharply focused in FIG. 9(*a*) than in FIG. 6(*b*) because of the lens optics.

The spot diagram predicting focus acuity in FIG. 9 (*a*) is based on the use of the lens and a slit assembly 580 with the performance being comparable to the focus acuity of a slit alone as shown in the spot diagram of FIG. 6 (*b*). An image is formed within a rectilinear area which is roughly equivalent to the predicted resolving power of the system.

Figure 9B:
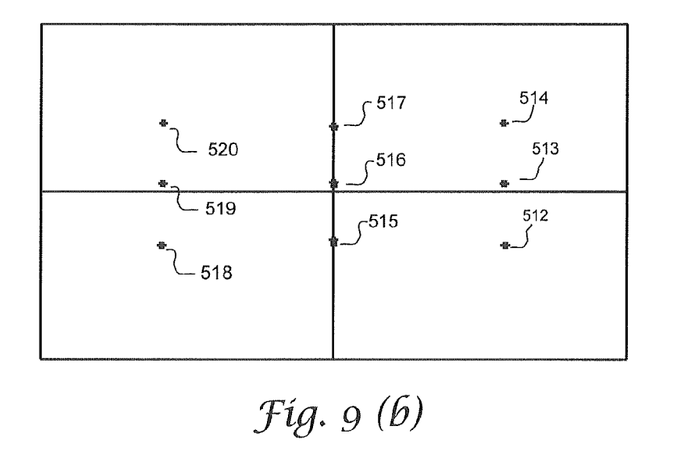

FIG. 9 (*b*) represents the visible image formed on the focal plane using the lens and slit assembly 580 in FIGS. 7(*a*), 7(*b*), and 8, in accordance with embodiments of the present invention. All of the targets are visible, because of the increased efficiency of the slit aperture. The interaction of the target rays 570 with the slit 550 inside the lens (see FIGS. 9(*a*) and 7(*b*))

has not eclipsed any of the target rays along the z axis. The performance using a lens with a slit aperture replacing the iris diaphragm has resulted in equivalent performance to the use of a slit alone with the added flexibility in placement afforded by a lens.

Although the shape of the slit 550 in FIG. 5 is rectangular, the shape of the slit 550 is generally any shape characterized by a long dimension in the z direction and a short dimension that is shorter than the long dimension. For example, one or more edges of the four edges of the rectangular slit 550 in FIG. 5 may be replaced by a curved surface.

In one embodiment, the shape of the slit is rectangular.

In one embodiment, the shape of the slit is non-rectangular.

In one embodiment, the shape of the slit has curvature.

In one embodiment, the shape of the slit has a shape of the iris of a cat's eye.

In one embodiment, the lens and slit assembly does not comprise an iris diaphragm.

In one embodiment, the slit is located in the lens and slit assembly where the iris diaphragm would be located in a conventional lens.

In one embodiment, the slit is disposed between two successive lens elements of the plurality of lens elements of the lens and the slit assembly.

In one embodiment, the slit is disposed between the camera and the plurality of lens elements of the lens and the slit assembly.

In one embodiment, the plurality of lens elements is disposed between the camera and the slit.

The improvement in flux collection of a slit over a pinhole having a 0.35 mm diameter in a diffraction range finder with a variable pitch grating has been measured by the inventors at 20 times the radiant flux at a similar level of focus acuity using a slit having a length of 9.1 mm, a width of 0.35 mm, and an aspect ratio (i.e., length / width) of 26. The lens that held the preceding slit was Fujinon CF16HA-1 16 mm f/1.4 Industrial Lens, Manual Iris and Focus, for High Resolution C-Mount Machine Vision Cameras, for ½-inch CCD.

The present invention has an advantage in the realization of a diffraction range finder with a variable pitch grating, because it will operate at lower light levels. There is always a limit to the amount of radiant energy available at a target. The use of a slit over a pinhole aperture is roughly the equivalent to having a four f-stop improvement in speed of a lens or an improvement from 64 to 1200 in the ISO number of a film. The improvement comes at no loss of acuity in the resulting image at the focal plane and without introducing any mechanical weakness in the imaging system. Use of a slit rather than a pinhole is unquestionably preferable for the design of a variable pitch grating diffraction range finder.

Diffraction range finders have many useful applications, and the present invention provides an improvement in performance with regard to sensitivity that allows diffraction range finders to be used where previously it was not practical. Notably in applications for microscopy where specimens absorb light especially when combined with limits on allowable radiation from lasers, the availability of a simple and effective improvement in sensitivity will have commercial benefits.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for forming a focused image on an image plane of a diffraction range finder with a variable pitch diffraction grating, said method comprising:

propagating diffracted light through a lens and slit assembly of the diffraction range finder after the diffracted light had been diffracted by the variable pitch diffraction grating of the diffraction range finder;

forming a focused image, from the diffracted light that propagated through the lens and slit assembly, onto the image plane of the diffraction range finder, said lens and slit assembly comprising a plurality of lens elements and a slit, said slit surrounded by opaque material that is opaque to the diffracted light passing through the slit, said slit having a shape characterized by a long dimension and a short dimension that is shorter than the long dimension.

2. The method of claim 1, wherein the shape of the slit is rectangular.

3. The method of claim 1, wherein the shape of the slit is non-rectangular.

4. The method of claim 1, wherein the shape of the slit has curvature.

5. The method of claim 1, wherein the shape of the slit is a shape of the iris of a cat's eye.

6. The method of claim 1, wherein the lens and slit assembly does not comprise an iris diaphragm.

7. The method of claim 6, wherein the slit is located in the lens and slit assembly where said iris diaphragm would be located in a conventional lens.

8. The method of claim 1, wherein the slit is disposed between two successive lens elements of the plurality of lens elements.

9. The method of claim 1, wherein the slit is disposed between the image plane and the plurality of lens elements.

10. The method of claim 1, wherein the plurality of lens elements is disposed between the camera and the slit.

11. A system for forming a focused image on an image plane of a diffraction range finder with a variable pitch diffraction grating, said system comprising:

the image plane of the diffraction range finder;

the variable pitch diffraction grating of the diffraction range finder; and a lens and slit assembly of the diffraction range finder, wherein diffracted light may traverse the lens and slit assembly after having been diffracted by the variable pitch diffraction grating, wherein the diffracted light is configured to form a focused image on the image plane after traversing the lens and slit assembly, said lens and slit assembly comprising a plurality of lens elements and a slit, said slit surrounded by opaque material that is opaque to the diffracted light configured to pass through the slit, said slit having a shape characterized by a long dimension and a short dimension that is shorter than the long dimension.

12. The system of claim 11, wherein the shape of the slit is rectangular.

13. The system of claim 11, wherein the shape of the slit is non-rectangular.

14. The system of claim 11, wherein the shape of the slit has curvature.

15. The system of claim 11, wherein the shape of the slit is a shape of the iris of a cat's eye.

16. The system of claim 11, wherein the lens and slit assembly does not comprise an iris diaphragm.

17. The system of claim 16, wherein the slit is located in the lens and slit assembly where said iris diaphragm would be located in a conventional lens.

18. The system of claim 11, wherein the slit is disposed between two successive lens elements of the plurality of lens elements.

19. The system of claim 11, wherein the slit is disposed between the image plane and the plurality of lens elements.

20. The system of claim 11, wherein the plurality of lens elements is disposed between the camera and the slit.

* * * * *